United States Patent [19]

Jeong et al.

[11] Patent Number: 5,714,950
[45] Date of Patent: *Feb. 3, 1998

[54] SYSTEM FOR VARIABLE-LENGTH-CODING AND VARIABLE-LENGTH-DECODING DIGITAL DATA

[75] Inventors: Jechang Jeong, Seoul; Byeungwoo Jeon, Sungnam, both of Rep. of Korea

[73] Assignee: Samsung Electronics Co., Ltd., Kyungki-do, Rep. of Korea

[*] Notice: The term of this patent shall not extend beyond the expiration date of Pat. No. 5,497,153.

[21] Appl. No.: 606,274

[22] Filed: Feb. 23, 1996

Related U.S. Application Data

[63] Continuation-in-part of Ser. No. 95,468, Jul. 23, 1993, Pat. No. 5,497,153.

[30] Foreign Application Priority Data

Jul. 23, 1992 [KR] Rep. of Korea ............... 92-13171

[51] Int. Cl.$^6$ .................................................. H03M 7/40
[52] U.S. Cl. ........................................ 341/67; 348/408
[58] Field of Search ............................. 341/50, 67, 63; 348/404

[56] References Cited

U.S. PATENT DOCUMENTS

| | | |
|---|---|---|
| 4,754,336 | 6/1988 | Nishizawa ............... 348/415 |
| 4,821,119 | 4/1989 | Gharavi ................... 348/402 |
| 4,972,260 | 11/1990 | Fujikawa . | 
| 5,021,891 | 6/1991 | Lee . |
| 5,134,396 | 7/1992 | Sirat et al. ............... 341/51 |
| 5,424,778 | 6/1995 | Sugiyama ................ 348/403 |

FOREIGN PATENT DOCUMENTS

| | | |
|---|---|---|
| 0301712 | 2/1989 | European Pat. Off. . |
| 62-145988 | 6/1987 | Japan . |
| 3 266565 | 11/1991 | Japan . |

OTHER PUBLICATIONS

Mutsima Ohta, et al., "A Comparison of Various Entropy Coding Methods for MCT/DCT Hybrid Coding", Mar. 19, 1987, pp. 17-24.

Chen et al., *A Block Transform Coder For Arbitrarily Shaped Image Segments*, Proceedings of the IEEE Conference on Image Processing, 1994, vol. 1 pp. 85-89.

*Primary Examiner*—Howard L. Williams
*Attorney, Agent, or Firm*—Sughrue, Mion, Zinn, Macpeak & Seas

[57] ABSTRACT

A system for coding and decoding digital data divided into segments which includes coding the segment data into symbols according to various scanning patterns, accumulating the various lengths of variable-length-coded data, selecting a scanning pattern corresponding to a minimum accumulated length, transmitting or storing the coded data according to the selected scanning pattern and scanning the transmitted or retrieved data according to the same scanning pattern as applied to the coding process, thereby decoding the scanned data. As a result, the efficiency of data compression can be improved by means of utilizing an optimized scanning pattern for coding and decoding the segment data.

71 Claims, 10 Drawing Sheets

FIG.3A (PRIOR ART) 8X8 SEGMENT DATA

FIG.3B (PRIOR ART) 8X8 QUANTIZATION COEFFICIENTS

FIG.3C (PRIOR ART) [RUN·LEVEL] CODING WITH ZIGZAG SCANNING PATTERN

OBJECT-ORIENTED SEGMENTS

SHAPE-ADAPTIVE TRANSFORMATION OF SEGMENT

QUANTIZATION OF TRANSFORMATION COEFFICIENTS

ZIG-ZAG SCAN OF TRANSFORM COEFFICIENTS

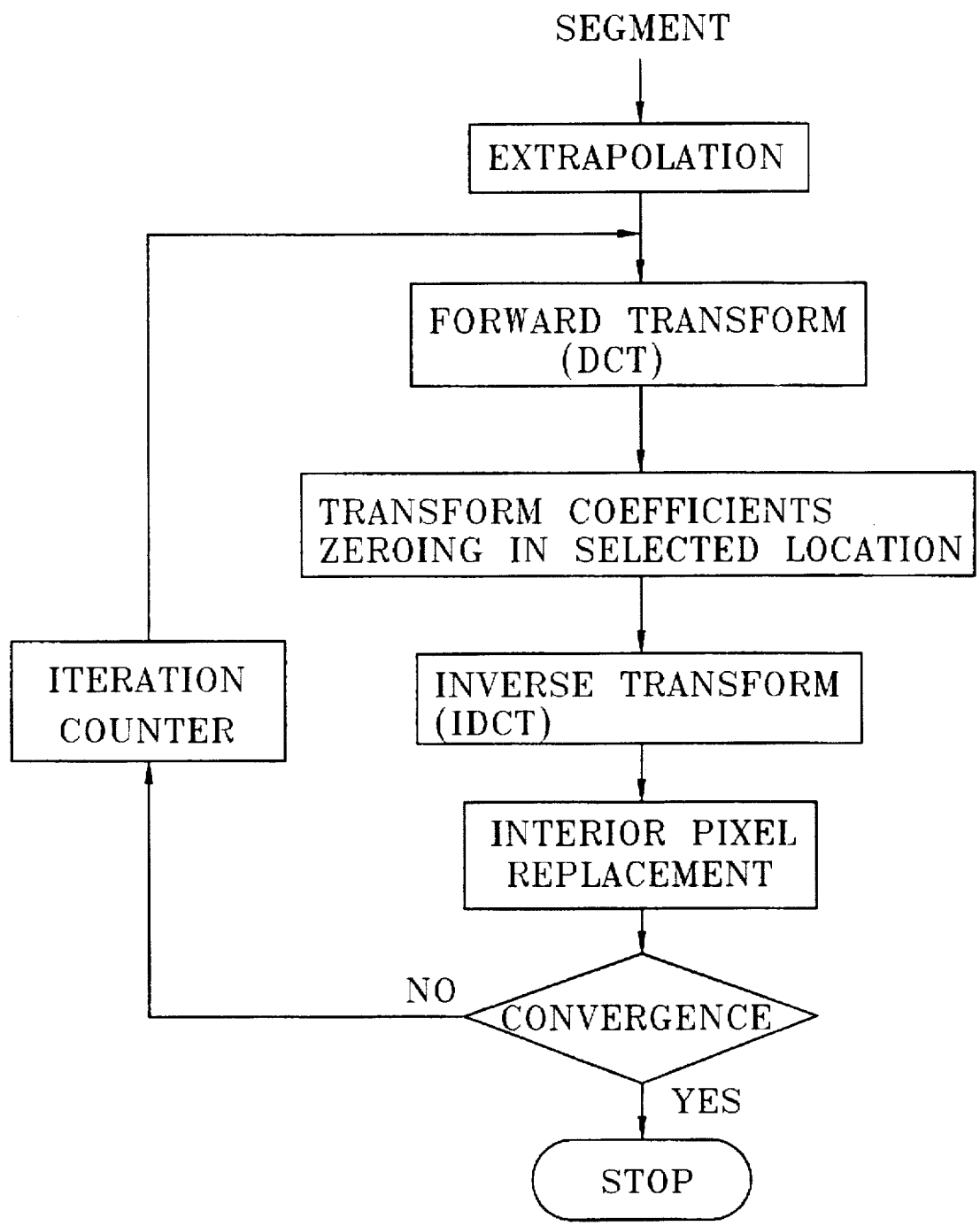

FIG. 8D

NUMBER INDICATES SCANNING ORDER OF DATA SEGMENT IN FIG.8C OR 8A

FIG. 8E

| 1 | 3 | 5 |14 |21 |40 | | |
|---|---|---|---|---|---|---|---|
| 2 | 6 |13 |22 |39 |   |   |   |
| 7 |12 |23 |38 |   |   |   |   |
|11 |24 |37 |   |   |   |   |   |
|25 |36 |   |   |   |   |   |   |
|35 |   |   |   |   |   |   |   |
|   |   |   |   |   |   |   |   |
|   |   |   |   |   |   |   |   |

| 4 | 9 |15 |29 |41 |   |   |   |
|---|---|---|---|---|---|---|---|
| 8 |16 |28 |42 |   |   |   |   |
|17 |27 |43 |   |   |   |   |   |
|26 |44 |   |   |   |   |   |   |
|45 |   |   |   |   |   |   |   |
|   |   |   |   |   |   |   |   |
|   |   |   |   |   |   |   |   |
|   |   |   |   |   |   |   |   |

|10 |19 |30 |49 |   |   |   |   |
|---|---|---|---|---|---|---|---|
|18 |31 |48 |   |   |   |   |   |
|32 |47 |   |   |   |   |   |   |
|46 |   |   |   |   |   |   |   |
|   |   |   |   |   |   |   |   |
|   |   |   |   |   |   |   |   |
|   |   |   |   |   |   |   |   |
|   |   |   |   |   |   |   |   |

|20 |34 |   |   |   |   |   |   |
|---|---|---|---|---|---|---|---|
|33 |   |   |   |   |   |   |   |
|   |   |   |   |   |   |   |   |
|   |   |   |   |   |   |   |   |
|   |   |   |   |   |   |   |   |
|   |   |   |   |   |   |   |   |
|   |   |   |   |   |   |   |   |
|   |   |   |   |   |   |   |   |

NUMBER INDICATES SCANNING ORDER OF DATA SEGMENTS IN FIG.8C

SYSTEM FOR VARIABLE-LENGTH-CODING AND VARIABLE-LENGTH-DECODING DIGITAL DATA

This is a continuation-in-part of application Ser. No. 08/095,468 filed Jul. 23, 1993 now U.S. Pat. No. 5,497,155.

BACKGROUND OF THE INVENTION

1. Field of the Invention

The present invention relates to a system for coding and decoding digital data, and more particularly to a coding and decoding system for coding digital data of a predetermined size using an optimized scanning pattern selected from among various scanning patterns and decoding the coded data, thereby further improving compression of stored or transmitted data. The present disclosure is based on Korean Patent Application No. 92-13171 filed Jul. 23, 1992, whose disclosure is incorporated herein by reference. This is a Continuation-In-Part of U.S. patent application Ser. No. 08/095,468, which is incorporated herein by reference.

2. Description of Related Art

Recently, various methods for coding video and audio signals into digital data to be transmitted or stored in a storing unit, and decoding the coded digital data so as to reproduce the audio/video signals, have been used in systems for transmitting and receiving video and audio signals. However, there is needed a technique for compressing further the quantity of transmission data so as to increase the transmission efficiency of data in such a coding and decoding system. Examples of methods for coding transmitted or stored data include a transformation coding method, a Differential Pulse Code Modulation (DPCM) method, a vector quantization method and a variable-length-coding method. The coding methods compress a total quantity of data, by removing redundant data which are included in the transmitted or stored digital data.

The video data of each frame is divided into a segment of a predetermined size and data-processed in a coding and decoding system for storing, transmitting and receiving the video signal. Each segment data or differential data between segment data is orthogonal-transformed, so that the video data is transformed into transformation coefficients in the frequency domain. Known segment data transformation methods include a Discrete Cosine Transform (DCT), a Walsh-Hadamard Transform (WHT), a Discrete Fourier Transform (DFT) and a Discrete Sine Transform (DST), among others. The transformation coefficients obtained by such transformation methods are properly coded according to the characteristic of coefficient data, so that compression efficiency is increased. Since human visual perception is more sensitive to low frequencies than to high frequencies, high frequency data is reduced by data-processing. Accordingly, the quantity of the coded data can be decreased.

SUMMARY OF INVENTION

It is a first object of the present invention to provide a coding system which adopts an optimized scanning pattern in accordance with data distribution characteristics of each segment to code the segment data.

It is a second object of the present invention to provide a decoding system which decodes segment data according to the same scanning pattern selected in the process of coding each segment data.

The first object of the present invention, in a method for coding the digital data which is divided into segments, comprises the following steps: scanning the segment data according to various scanning patterns, and coding the scanned data into symbols in accordance with each of the scanning patterns; coding respectively diverse symbols coded according to the various scanning patterns; accumulating separately the data which are coded at the coding step according to the various scanning patterns; selecting a scanning pattern corresponding to a minimum value among accumulated values of lengths of variable-length-coded data obtained at the accumulating step according to the various scanning patterns; and selecting as storage or transmission data, that data which is coded in the coding step according to the scanning pattern selected at the selecting step.

The second object of the present invention, in a method for decoding the data which are coded in segments, comprises the following steps: receiving or retrieving both coded data and scanning pattern data corresponding to the selected scanning pattern; variable-length-decoding the input coded data; outputting a predetermined scan address corresponding to the input scanning pattern data; decoding decoded symbols at decoding step according to the scan address, thereby transforming the symbols into predetermined coefficients.

This invention may be used for coding and/or decoding of data which is transmitted, or which is stored or retrieved from semiconductor memory, magnetic tape or disc, CD-ROM, digital video disc, or other storage media.

BRIEF DESCRIPTION OF THE DRAWINGS

The objects and features of the present invention will become more apparent from the consideration of the following detailed description taken in conjunction with the accompanying drawings in which:

FIGS. 3A–3C are diagrams for explaining an example of a conventional method for dividing digital data, as well as a scanning pattern and a coding process.

FIG. 3H is a flowchart of the POCS-based arbitrary shape transform.

FIG. 8D–8E show simple examples of scanning patterns for multiple segments in accordance with the present invention.

DETAILED DESCRIPTION OF THE PREFERRED EMBODIMENT

The preferred embodiment of the present invention will be described below with reference to the prior art and to the accompanying drawings, utilizing a variable-length coding method as an example.

Figure 1:
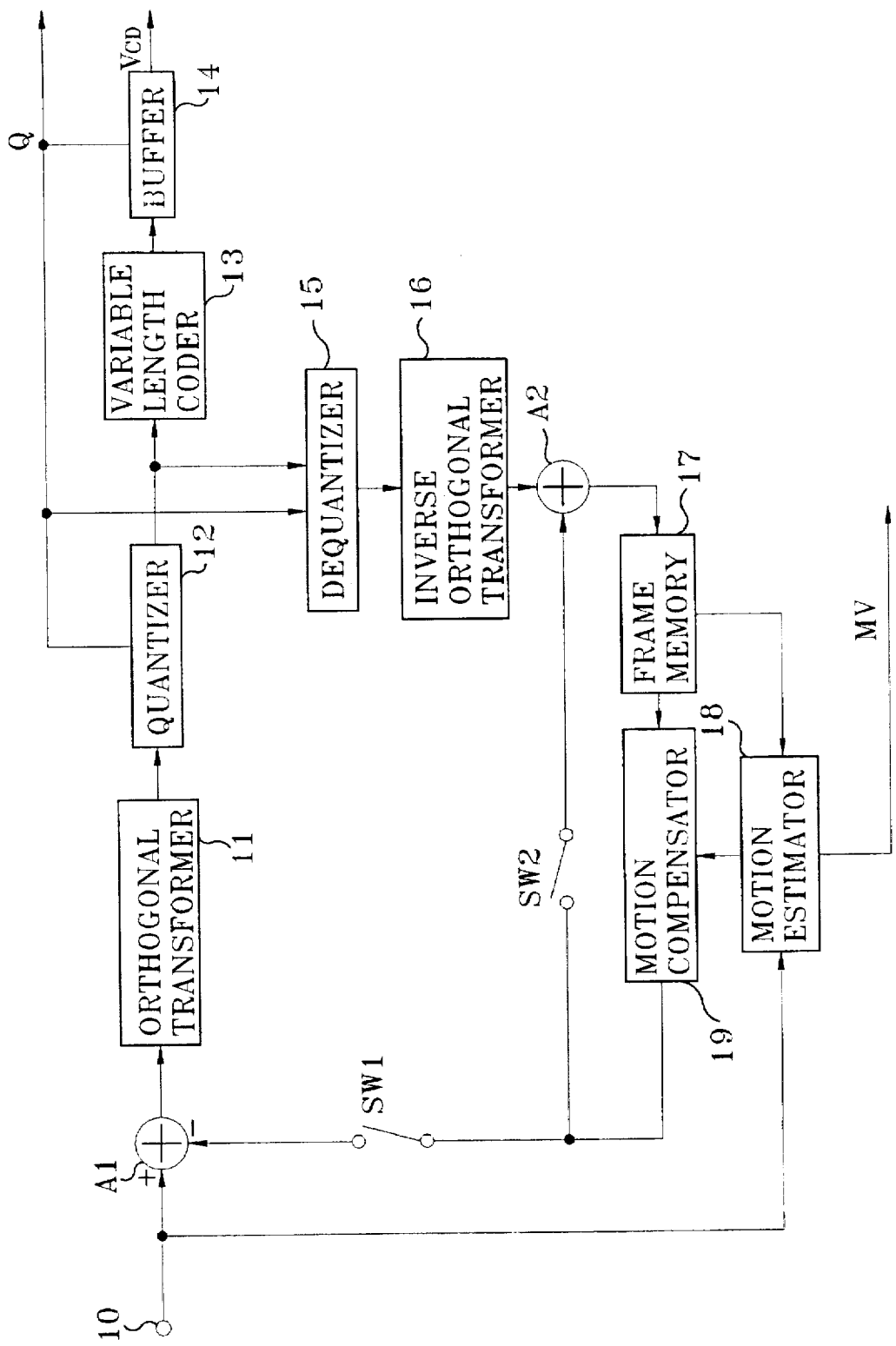
FIG. 1 is a block diagram showing an embodiment of a conventional coder utilizing a variable length coder.

FIG. 1 represents a schematic block diagram of a conventional coding apparatus of video data which uses a variable-length-coding method. First, an input terminal 10 receives data segments corresponding to image segments divided in a block manner, or corresponding to image segments divided in accordance with objects; block type segments are generally represented as having dimensions of $M_1 \times M_2$, and for the convenience of explanation, it is assumed that $M_1 = M_2 = M$. The segment data input through the input terminal 10 is added to a predetermined feedback data in a first adder A1, thereby calculating differential data between the two sets of data (i.e., between the input data and the feedback data). An orthogonal transformer 11 performs discrete-cosine-transforms on input differential data, thereby causing the differential data to be transformed into coefficients in the frequency domain. A quantizer 12 changes transform coefficients through a predetermined quantizing process into representative values of various levels. Then, the quantizer 12 variably quantizes the output data from the orthogonal transformer 11 according to a quantization level (Q) input from a buffer 14. A variable length coder 13 variable-length-codes the segment data, taking statistical characteristics of the quantization coefficients into consideration, thereby producing compressed data ($V_{CD}$). A variable-length-coding procedure with respect to the video data will be described hereinafter. The buffer 14 receives compressed data from the variable length coder 13 and outputs the data to a transmission channel at a constant rate. Then, the quantization level (Q) is output for controlling the quantity of compressed data, so as to prevent an overflow or an underflow in transmission data.

Generally, there are similar patterns between adjacent frames in the video data. Accordingly, in case of slight movement of an image, the motion of the image is estimated by comparing a present frame with previous frames. A motion vector (MV) is calculated as a result of the motion estimation. A motion compensation is achieved from previous frames with a motion vector. The quantity of differential data between segment data obtained from motion compensation and segment data input to the input terminal 10 is very small, so that the data can be further compressed in the above coding process. A feedback loop for performing the motion estimation and motion compensation includes a dequantizer 15, an inverse orthogonal-transformer 16, a frame memory 17, a motion estimator 18 and a motion compensator 19. The dequantizer 15 and inverse orthogonal-transformer 16 dequantizes and inversely discrete-cosine-transforms the quantization coefficients output from the quantizer 12, and transforms them into video data in the spatial domain. A second adder A2 adds the video data output from the inverse orthogonal-transformer 16 to the feedback data input via a second switch SW2, thereby outputting resultant segment data. The segment data output from the second adder A2 is sequentially stored in the frame memory 17, thereby reconstructing a frame. A motion estimator 18 retrieves the segment data which is the most similar data in pattern with the segment data input via the input terminal 10, from the frame data stored in the frame memory 17, and calculates the motion vector MV for estimating the motion of images from the two segment data. The motion vector MV is transmitted to a receiver and the motion compensator 19, in order to be used in a decoding system. The motion compensator 19 reads out the segment data corresponding to the motion vector MV from the frame data in the frame memory 17, and inputs the read data to the first adder A1. As described above, the first adder A1 calculates a differential data between the segment data input from the input terminal 10 and the segment data input from the motion compensator 19, then the differential data is coded, and the coded data is transmitted to the receiver. Moreover, the two switches SW1 and SW2 in FIG. 1 are refresh switches for refreshing the data in the unit of a frame or segment of a predetermined size, in order to prevent the difference between coded data of frames and unprocessed data of frames due to the accumulation of the differential data.

Figure 2:
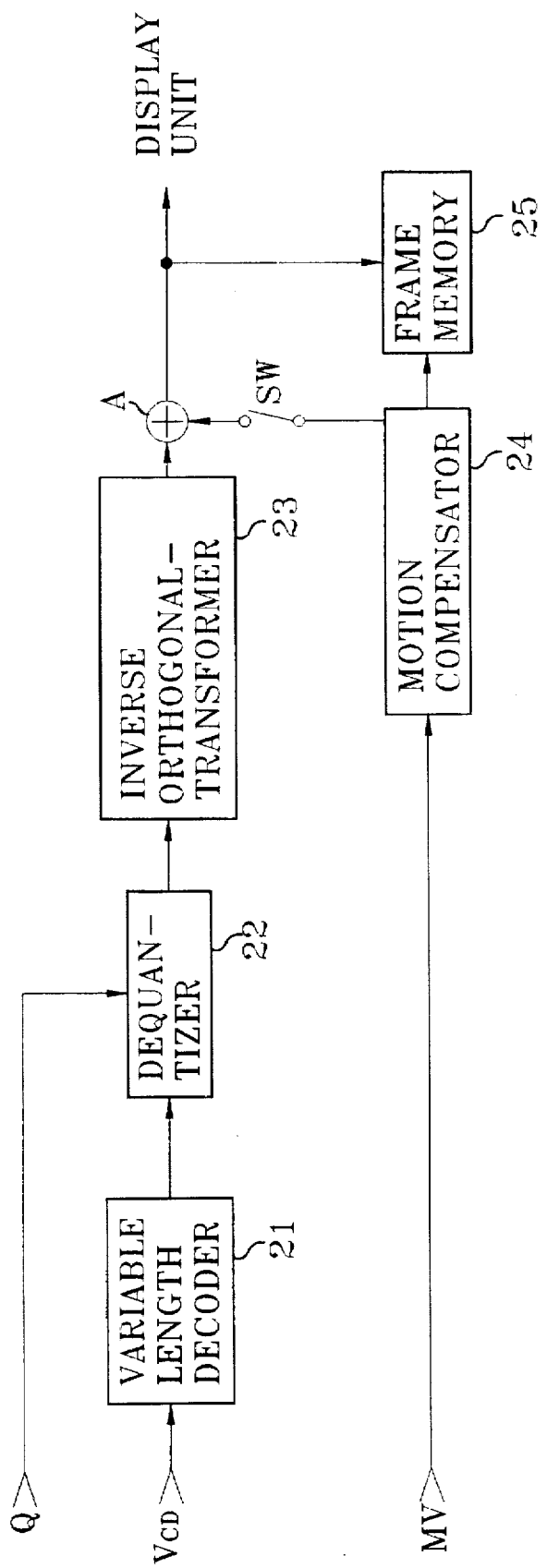
FIG. 2 is a block diagram showing an embodiment of a conventional decoder utilizing a variable length decoder.

The coded video data ($V_{CD}$) is stored on a storage medium, or transmitted to the receiver, and input to a decoder such as is shown in FIG. 2. A variable length decoder 21 decodes the input video data ($V_{CD}$) via an inverse process of variable-length-coding. A dequantizer 22 decodes quantization coefficients input from the variable length decoder 21, thereby outputting transformation coefficients in the frequency domain. An inverse orthogonal-transformer 23 transforms the transformation coefficients in the frequency domain, which are input from the quantizer 22, into video data in the spatial domain. The motion vector MV output from the motion estimator 18 of the coder is input to a motion compensator 24 of the decoder. The motion compensator 24 reads out the segment data corresponding to the motion vector MV from the frame data stored in a frame memory 24, and inputs the read data to an adder A. The adder A adds the differential data output from the inverse orthogonal-transformer 23 to the segment data input from the motion compensator 24, thereby outputting resultant reconstructed segment data. A switch SW connected to an output terminal of the motion compensator 24 plays the same role as the refresh switches of the above described coder in FIG. 1.

There has been used a Huffman Coding technique for variable-length-coding in a conventional coding system. Huffman Coding allocates codes differing in length according to a probability of a predetermined symbol in the input data. That is, the higher the probability, the shorter the code which is allocated, and the lower the probability, the longer the code which is allocated. In coding by means of a Huffman algorithm, in the case where there are many different symbols in abundance, and specific symbols have low probabilities, when long codes are allocated for a plurality of rare symbols by the Huffman algorithm, data-processing comes to be further complicated in the process of coding and decoding. In order to solve these problems, in the case that a code with a predetermined fixed length is allocated for a distribution area of a plurality of rare symbols (which is hereinafter assumed as an escape area), the complexity of the data-processing is greatly reduced, even if an average code length can be increased more than an average value of original Huffman codes.

FIG. 3A shows an example of a data structure in which the data is divided into segments of size 8×8. FIG. 3B shows 8×8 quantization coefficients which transform the segment data of 8×8 into data in the frequency domain and quantize the transformed data, and FIG. 3C shows the zig-zag scan of the quantization coefficients from low frequency to high frequency, and codes the scanned coefficient into [run, level] symbols, considering that many quantization coefficients are "0" in the frequency domain. In the run-length coding technique, the run means the number of occurrences of "0" between coefficients not "0", level does absolute values of coefficients not "0" In the case of the 8×8 data of FIGS. 3A–3C, the run can have values from "0" to "63". In the case where the quantization output is an integer value from "-255" to "255", the level is a value from "1" to "255", and the sign is separately indicated.

Figure 3D:
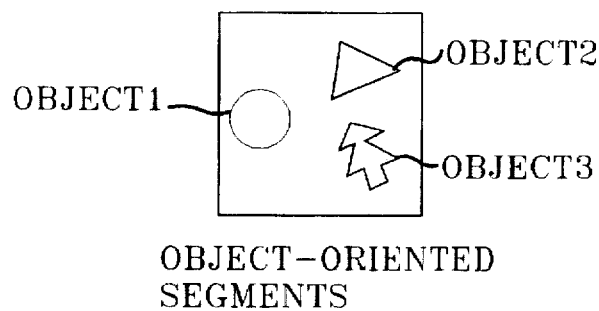
FIGS. 3D–3G are diagrams for explaining another example of a conventional method for dividing the digital data in accordance with various objects, as well as a scanning pattern and a coding process.
Figure 3E:
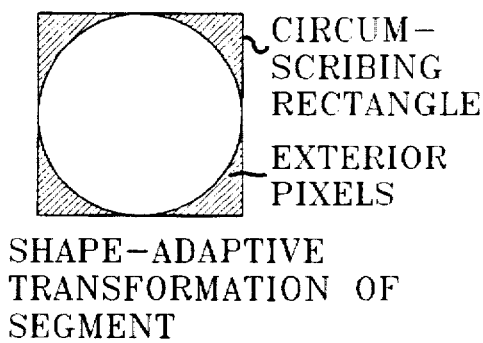
Figure 3F:
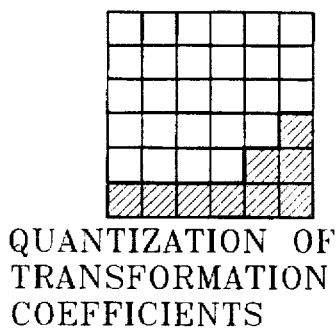

FIG. 3D shows another method of dividing the image data in such a way that division occurs in accordance with various objects. Each data segment corresponds to an object which is generally arbitrarily shaped. FIG. 3E shows an example of encoding the data segment which corresponds to an object. Since the shape of an object is arbitrary, a special transform method is necessary in which the traditional block-based orthogonal transform is exercised on a rectangle circumscribing the given object. The pixel values outside the given object but inside the circumscribing rectangle are adaptively selected so that with the selected number of transform coefficients, the object can be best reconstructed. FIG. 3F shows an example of selecting transform coefficients. In case of the data segment representing an image portion having L pixels, there can be a maximum of L meaningful transform coefficients in a transform domain. The coefficients in the hatched area of FIG. 3F are made to be zeros or known values by selecting the values of exterior pixels in FIG. 3E. The selected L or fewer pixels and zeroed transform coefficients in FIG. 3F are further compressed using run-length coding and variable-length-coding.

The process of transform coefficients selection and extrapolation is further described with reference to the flowchart in FIG. 3H.

The pixel values outside the given object are selected in a POCS-based iterative way. In the first iteration, the outside pixel values can be arbitrarily set up; however, it is known to be effective to repeat or mirror the inside pixel values. [S. F. Chang and D. G. Messerschmitt, "Transform Coding of an Arbitrarily-shaped Image Segment" Proceedings of ACM Multimedia, August, 1993.] Once the outer pixel values are selected, the rectangular block is forward transformed to obtain L or fewer transform coefficients. Since the magnitude of each transform coefficient corresponds to energy associated with the coefficient, one method of coefficient selection is to select L (or a predetermined smaller number) largest transform coefficients.

Once the coefficients are selected, others are set to zero. This coefficient zeroing undoubtedly causes distortions of the signal in the spatial domain. Therefore, after inverse transforming the coefficients being zeroed at de-selected locations, the pixel values inside and at the boundaries of the object are replaced by the original values.

Figure 3G:
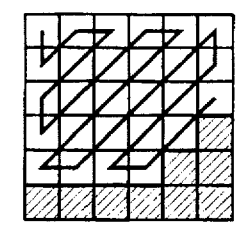

Note that only the exterior pixel values are affected by the forward, inverse transform and interior pixel replacement; however, the coefficient values at de-selected locations may not be zeros any more. For this reason, the previous "forward transform→zeroing→inverse transform→interior pixel replacement" processes are repeated until convergence. The convergence is known to be guaranteed (as seen in H. H. Chen, M. R. Civanlar, and B. G. Haskell, "A Block Transform Coder for Arbitrarily Shaped Image Segments" Proceedings of IEEE International Conference on Image Processing, 1994, Vol. 1, 85–89). Once convergence is reached, the shape-adaptive transform is complete and the transform coefficients can be further compressed, for example, by run-length coding and variable-length-coding as shown in FIGS. 3F and 3G. The transform coefficients block in FIG. 3F is scanned in zig-zag scan order to be run-length encoded. The [run, level] symbols are further compressed by variable-length-coding.

Figure 4:
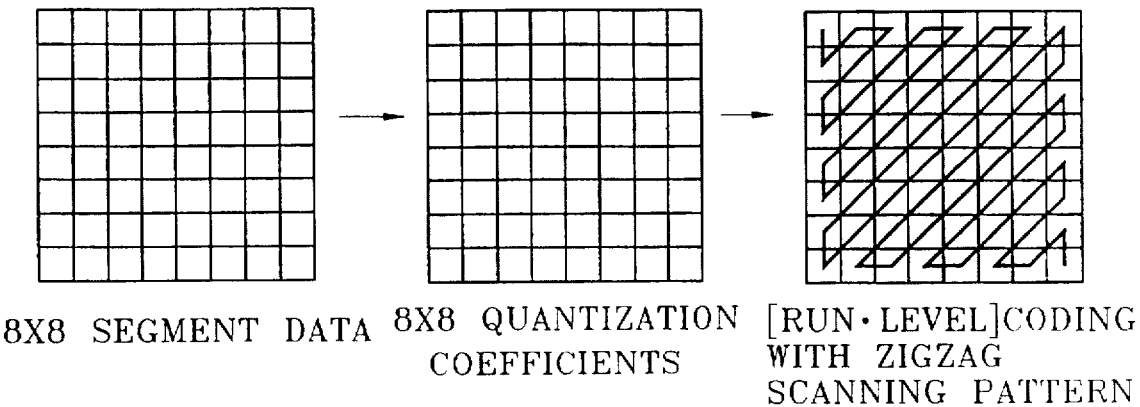
FIG. 4 is a diagram for explaining a distribution state of variable-length-coded data.
Figure 4:
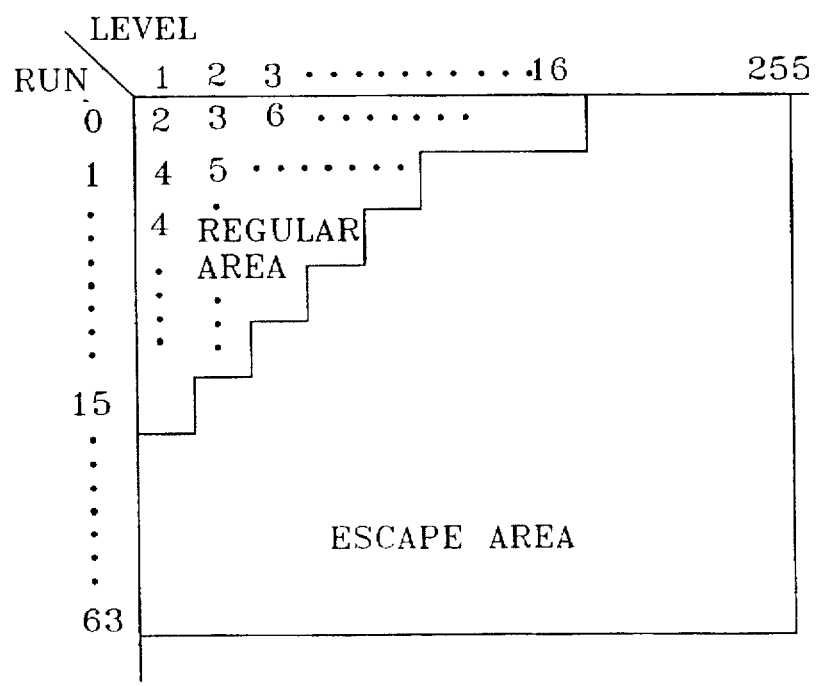

FIG. 4 shows an escape area and a regular area classified according to probabilities of [run level] symbols. A probability of symbols with a large value of run and/or level in run level symbols is very low statistically. A distribution area of symbols with a low probability, that is, an escape area, in which the symbols are represented as an escape sequence of fixed length, and a regular Huffman code is allocated for the other area (regular area). For example, in the case of 8×8 segment data, the escape sequence consists of 6-bit escape symbols, 6-bit runs for representing from "0" to "63", 8-bit levels for showing from "1" to "255"and a sign bit of 1-bit. Accordingly, the escape sequence has a fixed length of a total of 21 bits.

A conventional variable-length-coding system has utilized a zig-zag scanning pattern (described in FIGS. 3A–3C) for N×N quantization coefficients in variable-length-coding the video data, because the energy of the video signal is concentrated at the low frequency domain centered around AC components. However, the energy of the video signal can be more widely distributed to frequency components of a horizontal orientation or a vertical orientation according to the pattern of the video signal. Therefore, a conventional zig-zag scanning pattern is not necessarily an optimal scanning pattern for variable-length-coding the video data. Accordingly, scanning patterns which can be adaptably sloped to a horizontal orientation or a vertical orientation according to the distribution characteristics of the video data, are desirable for variable-length-coding and variable-length-decoding.

Figure 5:
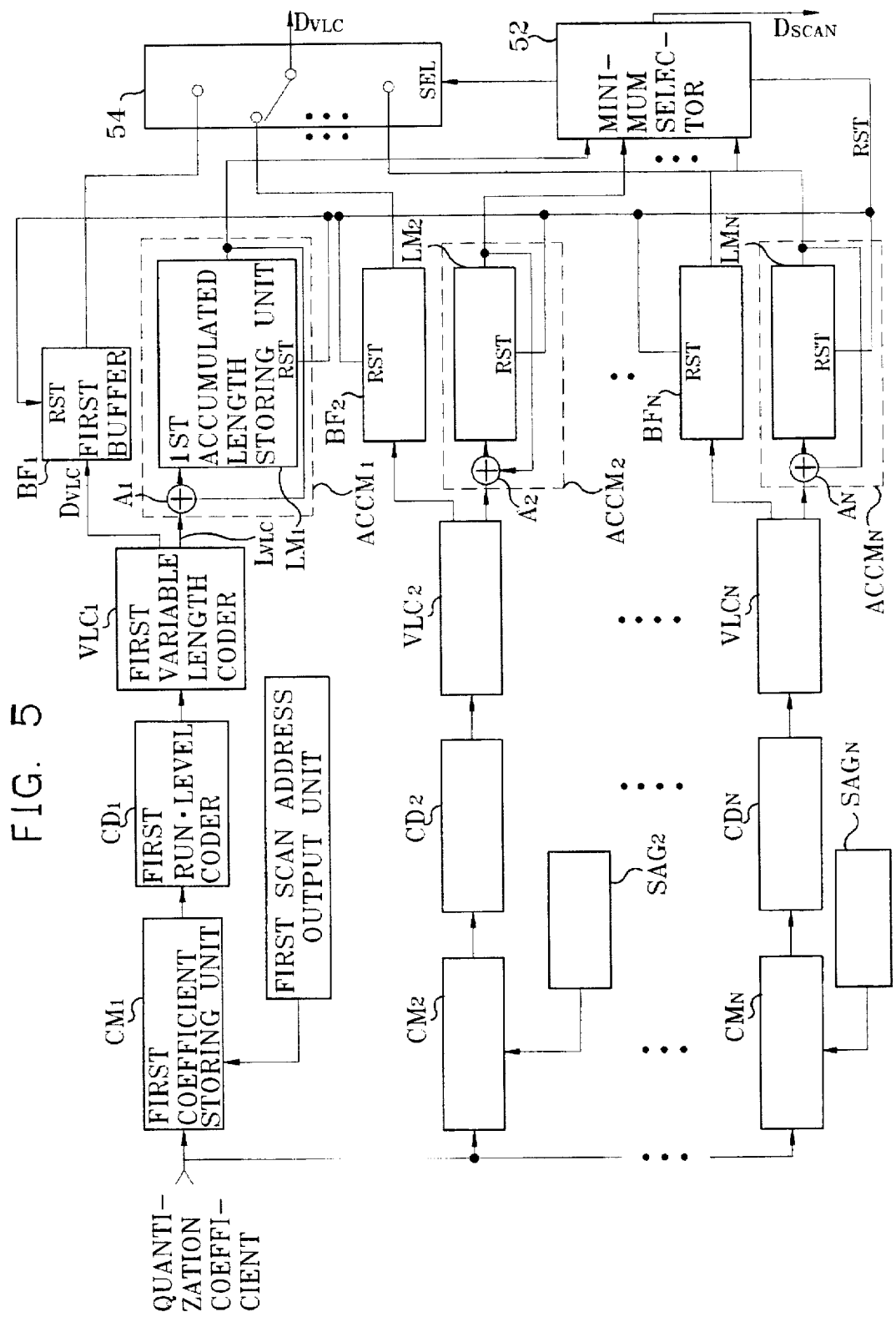
FIG. 5 is a block diagram showing an embodiment of a variable length coder in accordance with the present invention.

FIG. 5 shows a variable length coder in accordance with an embodiment of the present invention. The coder of FIG. 5 comprises N coefficient storing units ($CM_1$–$CM_N$) for respectively storing the quantization coefficients of quantized segment data such as the quantized segment data shown in FIG. 3B and FIG. 3F; N scan address output units ($SAG_1$–$SAG_N$) for providing different scan addresses to each of the coefficient storing units; N [run level] coders ($CD_1$–$CD_N$) for [run level] coding coefficients in each of coefficient storing units according to respective scanning patterns; N variable length coders ($VLC_1$–$VLC_N$) for variable-length-coding [run level] symbols output from each of the [run level] coders according to a variable-length-coding map; N buffers ($BF_1$–$BF_N$) for storing the variable-length-coding data of each of the variable length coders; N accumulators ($ACCM_1$–$ACCM_N$) for separately accumulating the lengths of variable-length coded data output from each of the variable length coders; a minimum selector 52 for selecting a minimum value among accumulated lengths in N accumulators; and a selecting switch 54 for selecting and transmitting the buffer output of variable-length coding channels selected in the minimum selector 52.

First, the quantization coefficients which are quantized in a segment of a predetermined size, are stored in each of the N coefficient storing units ($CM_1$–$CM_N$). The first, second, and N coefficient storing units respectively receive the first, second, and N scan addresses, which are separately output from the first, second, and N scan address output units. Described below is a coding channel for the first coefficient storing unit ($CM_1$) among N coefficient storing units which are scanned by each of the N scan addresses.

The quantization coefficients stored in the first coefficient storing unit ($CM_1$) are scanned toward a predetermined scanning orientation by the first scan address, and coded to a [run level] symbol in the first [run level] coder ($CD_1$). The first variable length coder ($LC_1$) variable-length-codes the [run level] symbol input from the first [run level] coder ($CD_1$) according to a predetermined variable-length-coding map, and respectively outputs variable-length-coded data ($D_{VLC}$) and the length of the variable-length-coded data ($L_{VLC}$). The variable-length-coded data ($D_{VLC}$) output from the first variable length coder (VLC$_1$) is stored in the first buffer (BF$_1$), and the length of the variable-length-coded data (L$_{VLC}$) is input and accumulated to the first accumulator (ACCM$_1$), which accumulates the lengths (L$_{VLC}$) of the codes that are coded by the first unit (VLC$_1$). The first accumulator (ACCM$_1$) consists of an adder (A$_1$) and an accumulated length storing unit (LM$_1$). The length of the variable-length-coded data (L$_{VLC}$) which is input from the first variable length coder (VLC$_1$) is added to accumulated lengths which are fed back from the first accumulated length storing unit (LM$_1$) in the adder (A$_1$). The first accumulated length storing unit (LM$_1$) stores an updated accumulated length output from the adder (A$_1$).

Figure 7A:
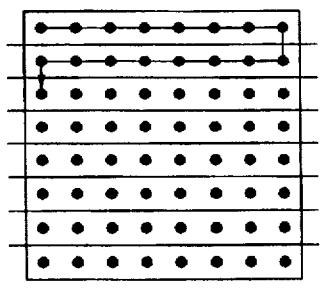
FIGS. 7A–7C are diagrams for explaining the scanning patterns used in connection with FIGS. 5 and 6.
Figure 7B:
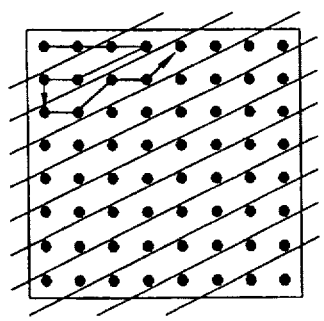
Figure 7C:
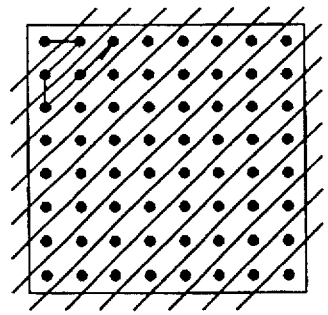

A series of such coding channels are applied to the quantization coefficients of the second, third, and N coefficient storing units (CM$_2$, CM$_3$, CM$_4$). However, different patterns are used for scanning the quantization coefficients in a segment which are respectively stored in N coefficient storing units. FIG. 7 shows examples of several different scanning patterns. The scanning pattern of FIG. 7A has a scanning orientation of 0 degrees; FIG. 7B depicts a scanning pattern having a scanning orientation of 30 degrees; and FIG. 7C depicts a scanning pattern having a scanning orientation of 45 degrees.

In case of data segments corresponding to image segments which correspond to objects that are arbitrarily shaped and for which the transformation is exercised for the circumscribing rectangle, the scanning pattern may not necessarily need to cover all the frequency components.

In channels of variable-length-coding with various scanning patterns, N accumulators (ACCM$_1$–ACCM$_N$) respectively provide the accumulated length data stored in each of the accumulated length storing units, to N input terminals of the minimum selector 52, which determines the minimum value of the accumulated lengths. Each of the output terminals of N buffers (BF$_1$–BF$_N$), which store the variable-length-coded data according to N types of scanning patterns, are separately connected to N input terminals of the selecting switch 54. The minimum selector 52 selects a minimum value among the accumulated length data input from each of the N accumulated length storing units (LM$_1$–LM$_N$). The minimum selector 52 outputs a scanning pattern data (D$_{SCAN}$) which represents scanning patterns of variable-length-coding channels with a selected minimum value of accumulated lengths, and provides a predetermined selecting control signal (SEL) corresponding to the selected minimum value of accumulated lengths to the selecting switch 54. The selecting switch 54 selects and outputs a variable-length-coded data (D$_{VLC}$) with the minimum value of accumulated lengths among the input data which are respectively input to N input terminals.

Whenever a minimum value is selected, that is, when the variable-length-coding of every segment data is completed, the minimum selector 52 generates a reset signal (RST), thereby resetting the N buffers (BF$_1$–BF$_N$) and the N accumulated length storing units (LM$_1$–LM$_N$). The variable-length-coded data (D$_{VLC}$) and the scanning pattern data (D$_{SCAN}$), which are output from the variable length coder, may then be stored as digital data or transmitted to a receiver for decoding.

Figure 6:
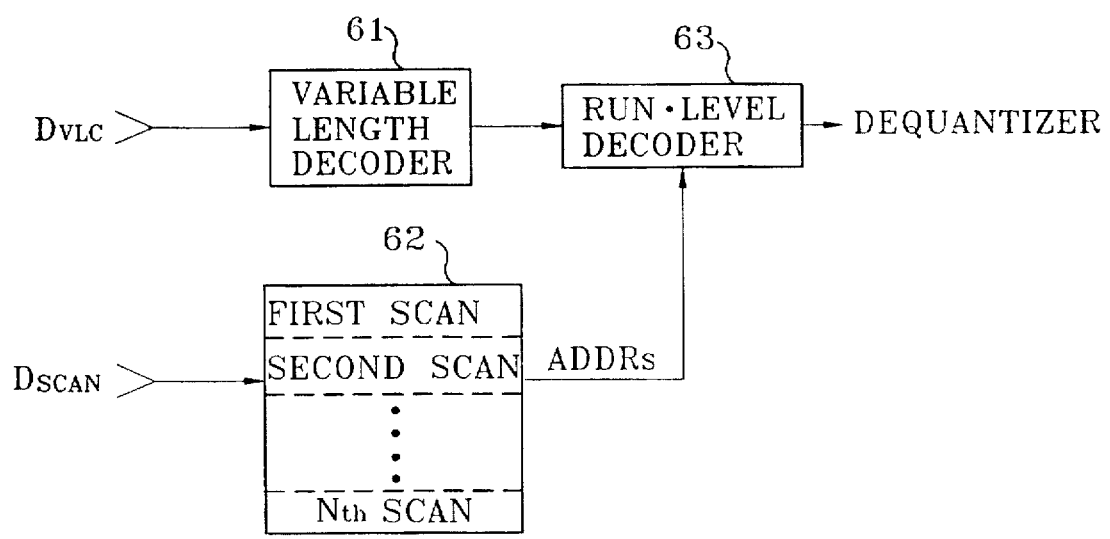
FIG. 6 is a block diagram showing an embodiment of a variable length decoder in accordance with the present invention.

FIG. 6 shows an embodiment of a variable length decoder in accordance with the present invention. Referring to FIG. 6, the input variable-length-coded data (D$_{VLC}$) input to a variable length decoder 61 are transformed to the [run level] symbol according to a variable-length-decoding map. Moreover, the scanning pattern data (D$_{SCAN}$) transmitted from the coder is input to a scanning pattern selector 62 which stores each of the scanning addresses corresponding to various scanning patterns (1, N scans), such as those shown in FIG. 7. The scanning pattern selector 62 selects and outputs scan addresses (ADDR$_1$) corresponding to the input scanning pattern data (D$_{SCAN}$). A run level decoder 63 transforms the [run level] symbols input from the variable length decoder 61 into the two-dimensional quantization coefficients according to the scan addresses (ADDRs) input from the scanning pattern selector 62. Then, the quantization coefficients are provided to a dequantizer.

As described above, the variable-length-coding system in accordance with the present invention variable-length-codes each segment data according to diverse scanning patterns, and then transmits both a scanning pattern which minimizes the length of variable-length-coded data and variable-length-coded data according to the scanning pattern, or stores that data on a digital recording medium for later decoding. The variable-length-decoding system in accordance with the present invention variable-length-decodes the stored or transmitted variable-length-coded data according to the same scanning pattern as utilized in the process of variable-length-coding. As a result, the system for variable-length-coding and variable-length-decoding can further compress the transmission data.

In the present invention, each of the segment data may correspond to various sizes and shapes of image portions. That is, the present invention may be used for encoding and decoding segment data regardless of how the digital data is divided into segment data. This can be best understood by referring to FIGS. 3D–3H. Once the shape-adaptive transform is completed as previously described, the transform coefficients in a rectangular block are scanned in multiple scan orders, and a particular scan order is selected in the same way as described with reference to FIG. 5. Therefore it is readily apparent how the present invention described with respect to FIG. 5 can be extended to more general cases of image portions with various sizes and shapes.

While the present invention has been illustrated and described using a variable-length coder/decoder, another type of coder/decoder may be used with the present invention. For example, a Huffman or arithmetic coder/decoder may be substituted. Additionally, the present invention may be used without a variable-length coder/decoder, since the benefit of the present invention may be obtained by utilizing the optimum scanning pattern regardless of the type of the coder/decoder.

Furthermore, while the present invention has been illustrated and described in connection with two-dimensional data, the present invention can be applied to a coding and decoding system which utilizes multi-dimensional data.

Figure 8A:
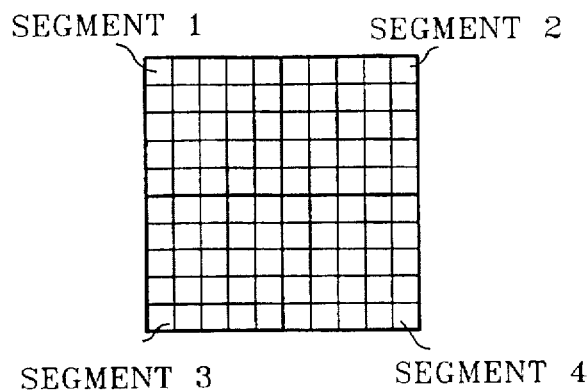
FIG. 8A–8C show simple examples of multiple segments scanning in accordance with the present invention.
Figure 8B:
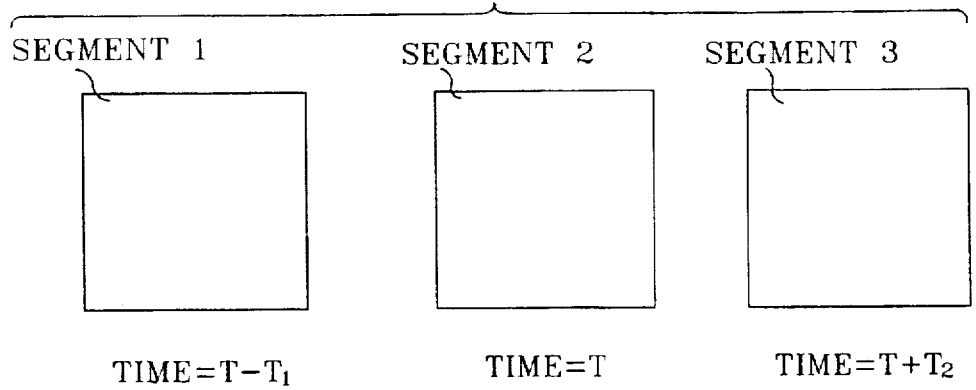
Figure 8C:
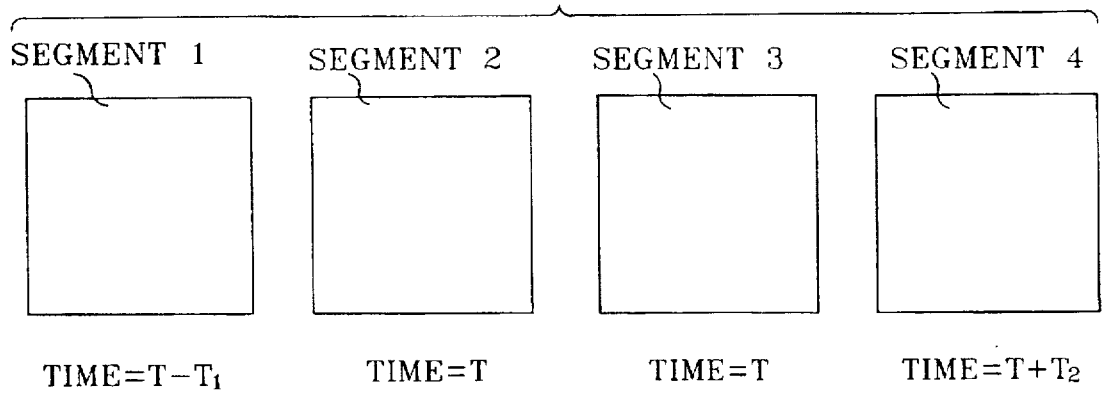

The extension to multi-dimensions can be realized by simultaneously scanning multiple segments together. FIG. 8A–B show simple examples of multiple segments scanning. FIG. 8A shows a particular example of when the multiple segments are from the same picture. However, segments at different times can also be scanned simultaneously, as shown, for example, in FIG. 8B. Without any limit, the two cases of FIG. 8A and 8B can be mixed as shown in FIG. 8C. FIGS. 8D and 8E show examples of scanning patterns for multiple segments.

The present invention can always be applied without any limit to multi-dimensional cases.

What is claimed is:

1. A coding method for coding digital data which is divided into segments, the method comprising the steps of:

obtaining quantization coefficients of digital data;

arranging said quantization coefficients as quantized segment data;

scanning the quantized segment data according to a plurality of scanning patterns, and transforming the scanned quantized segment data into symbols in accordance with each of the scanning patterns, each symbol having a length;

coding said symbols;

separately accumulating a plurality of lengths of data coded at said coding step according to said plurality of scanning patterns;

selecting a scanning pattern corresponding to a minimum value among accumulated values of lengths of coded data obtained at said accumulating step; and selecting as one of transmission data and storage data, the data which is coded at said coding step according to the scanning pattern selected at said selecting step.

2. A coding method for coding digital data which is divided into segments, the method comprising the steps of:

obtaining quantization coefficients of digital data;

arranging said quantization coefficients as quantized segment data;

scanning the quantized segment data according to a plurality of scanning patterns, and coding the scanned quantized segment data into symbols in accordance with each of the scanning patterns, each symbol having a length;

separately accumulating said symbols according to said plurality of scanning patterns;

selecting a scanning pattern corresponding to a minimum value among accumulated values of lengths of said symbols obtained at said accumulating step; and selecting as one of transmission data and storage data, the symbol corresponding to the scanning pattern selected at said selecting step.

3. The coding method as claimed in claim 2, wherein said coding step is a run-length coding step.

4. The coding method as claimed in claim 2, wherein said quantized segment data represent image segments which are block-wise divisions of predetermined size of an image.

5. The coding method as claimed in claim 2, wherein said quantized segment data represent image segments of an image in which the size and shape of said image segments are selected in accordance with objects within said image.

6. The coding method as claimed in claim 1 or 2, wherein said step for selecting a scanning pattern corresponding to a minimum value among accumulated values of lengths of coded data, includes a sub-step for selecting a minimum value among a plurality of accumulated values and simultaneously resetting the values to a predetermined initial value, which are accumulated values of the step for accumulating the lengths of coded data.

7. The coding method as claimed in claim 1 or 2, wherein said step for selecting a scanning pattern corresponding to a minimum value among accumulated values of lengths of coded data, includes a sub-step for selecting a minimum value among a plurality of accumulated values and simultaneously resetting the data to a predetermined initial value, which is coded data at said coding step.

8. The coding method as claimed in claim 1 or 2, wherein a series of processes for coding according to a plurality of scanning patterns are separately performed for a plurality of segment data.

9. The coding method as claimed in claim 2, further including a decoding method comprising the steps of:

inputting scanning pattern data;

inputting the coded data;

decoding said input coded data into symbols;

outputting a predetermined scan address corresponding to said input scanning pattern data; and decoding said symbols at said decoding step according to said scan address, thereby transforming the symbols into predetermined coefficients.

10. A coding method for coding digital data which is divided into segments, the method comprising the steps of:

obtaining quantization coefficients of digital data;

arranging said quantization data as quantized segment data;

scanning the segment data according to a plurality of scanning patterns, and transforming the scanned data to symbols in accordance with each of the scanning patterns;

coding respective symbols transformed according to said plurality of scanning patterns;

separately accumulating a plurality of lengths of data coded at said coding step according to said plurality of scanning patterns;

selecting a scanning pattern corresponding to a minimum value among accumulated values of lengths of coded data obtained at said accumulating step; and selecting as one of transmission data and storage data, the data which is coded at said coding step according to the scanning pattern selected at said selecting step, wherein said segment data represent image segments which are block-wise divisions of predetermined size of an image.

11. The coding method as claimed in claim 10, wherein said coding step is a run-length-coding step.

12. The coding method as claimed in claim 10, wherein said coding step is a variable-length-coding step.

13. The coding method as claimed in claim 12, wherein said step for selecting a scanning pattern corresponding to a minimum value among accumulated values of lengths of variable-length-coded data, includes a sub-step for selecting a minimum value among a plurality of accumulated values and simultaneously resetting the values to a predetermined initial value, which are accumulated values of the step for accumulating the lengths of coded data.

14. The coding method as claimed in claim 12, wherein said step for selecting a scanning pattern corresponding to a minimum value among accumulated values of lengths of variable-length-coded data, includes a sub-step for selecting a minimum value among a plurality of accumulated values and simultaneously resetting the data to a predetermined initial value, which is variable-length-coded data at said variable-length-coding step.

15. The coding method as claimed in claim 12, wherein a series of processes for variable-length-coding according to a plurality of scanning patterns are separately performed for a plurality of segment data.

16. The coding method as claimed in claim 12, further including a decoding method comprising the steps of:

inputting scanning pattern data;

inputting said coded symbols as variable-length-coded data;

variable-length-decoding said input variable-length-coded data to produce variable-length-decoded symbols;

outputting a predetermined scan address corresponding to said input scanning pattern data; and decoding said variable-length-decoded symbols produced in said variable-length-decoding step according to said scan address, thereby transforming the variable-length-decoded symbols into predetermined coefficients.

17. A coding method for coding digital data which is divided into segments, the method comprising the steps of:

obtaining quantization coefficients of digital data;

arranging said quantization coefficients as quantized segment data;

scanning the segment data according to a plurality of scanning patterns, and transforming the scanned data to symbols in accordance with each of the scanning patterns;

coding respective symbols transformed according to said plurality of scanning patterns;

separately accumulating a plurality of lengths of data coded at said coding step according to said plurality of scanning patterns;

selecting a scanning pattern corresponding to a minimum value among accumulated values of lengths of coded data obtained at said accumulating step; and selecting as transmission data, the data which is coded at said coding step according to the scanning pattern selected at said selecting step, wherein said segment data represent image segments of an image in which the size and shape of said image segments are selected in accordance with objects within said image.

18. The coding method as claimed in claim 17, wherein said coding step is a run-length-coding step.

19. The coding method a claimed in claim 17, wherein said coding step is a variable-length-coding step.

20. The coding method as claimed in claim 19, wherein said step for selecting a scanning pattern corresponding to a minimum value among accumulated values of lengths of coded data, includes a sub-step for selecting a minimum value among a plurality of accumulated values and simultaneously resetting the values to a predetermined initial value, which are accumulated values of the step for accumulating the lengths of coded data.

21. The coding method as claimed in claim 19, wherein said step for selecting a scanning pattern corresponding to a minimum value among accumulated values of lengths of coded data, includes a sub-step for selecting a minimum value among a plurality of accumulated values and simultaneously resetting the data to a predetermined initial value, which is variable-length-coded data at said variable-length-coding step.

22. The method as claimed in claim 19, wherein a series of processes for variable-length-coding according to a plurality of scanning patterns are separately performed for a plurality of segment data.

23. The coding method as claimed in claim 19, further including a decoding method comprising the steps of:

inputting scanning pattern data;

inputting variable-length-coded data obtained in the variable-length-coding step;

variable-length-decoding said input variable-length-coded data;

outputting a predetermined scan address corresponding to said input scanning pattern data; and decoding variable-length-decoded symbols at said variable-length-decoding step according to said scan address, thereby transforming the variable-length-decoded symbols into predetermined coefficients.

24. The coding method as claimed in claim 17, wherein at least one of said image segments circumscribes a given object within said image.

25. The coding method as claimed in claim 24, wherein transform coefficients of image areas outside of said object but inside a corresponding image segment are selected to be a predetermined value.

26. A coding apparatus for coding digital data which is divided into segments, the apparatus comprising:

input terminals for inputting quantization coefficients of said digital data;

coefficient storing units for respectively storing quantization coefficients input through said input terminals;

means for outputting different scan addresses to said coefficient storing units according to scanning patterns;

coders for transforming the quantization coefficients which are stored in said coefficient storing units, into symbols according to the scanning patterns with input respective scan addresses;

buffers for separately storing said symbols output from said coders;

accumulators for separately accumulating the lengths of said symbols output from said coders;

a minimum selector for selecting a minimum value among accumulated lengths output respectively from said accumulators;

means for selecting a predetermined buffer among said buffers according to a designated selecting signal input from said minimum selector; and means for outputting both scanning pattern data which represents a scanning pattern corresponding to a minimum value selected from said minimum selector and said symbols which are output from the selected buffer selected by said buffer selector, to transmission channels.

27. The coding apparatus as claimed in claim 26, wherein said coders are run level coders.

28. The coding apparatus as claimed in claim 26, wherein each of said accumulators for separately accumulating the lengths of said symbols comprises:

an adder for adding a corresponding one of the lengths of said symbols which are input from said coders to a predetermined accumulated length which is fed back from an accumulated length storing unit; and a storing unit for storing the data output by said adder to update an accumulated length, and outputting the accumulated length to said adder.

29. The coding apparatus as claimed in claim 26, wherein said minimum selector selects said minimum value and simultaneously inputs respective reset signals to said buffers, thereby resetting said buffers to a predetermined initial value.

30. The coding apparatus as claimed in claim 26, wherein said minimum selector selects said minimum value and simultaneously inputs respective reset signals to said accumulators, thereby separately resetting said accumulators to a predetermined initial value.

31. The coding apparatus as claimed in claim 30, wherein said reset signals which are separately input to said accumulators, reset said accumulators.

32. The coding apparatus as claimed in claim 26, wherein a selecting signal input from said means for selecting a predetermined buffer among said buffers, is a signal for selecting a buffer which stores symbols according to a scanning pattern that corresponds to a selected minimum value in said minimum selector.

33. A coding apparatus for coding digital data which is divided into segments, the apparatus comprising:

input terminals for inputting quantization coefficients of said digital data;

coefficient storing units for respectively storing the quantization coefficients input through said input terminals;

means for outputting different scan addresses to said coefficient storing units according to scanning patterns;

first coders for transforming coefficients which are stored in said coefficient storing units, into symbols according to the scanning patterns with input respective scan addresses;

second coders for respectively coding the data output from said first coders, and outputting the coded data;

buffers for separately storing the coded data output from said second coders;

accumulators for separately accumulating the lengths of the coded data output from said second coders;

a minimum selector for selecting a minimum value among accumulated lengths output respectively from said accumulators;

means for selecting a predetermined buffer among said buffers according to a designated selecting signal input from said minimum selector; and means for outputting both scanning pattern data which represents a scanning pattern corresponding to a minimum value selected from said minimum selector and coded data which are output from the selected buffer in said buffer selector, to transmission channels.

34. The coding apparatus as claimed in claim 33 wherein said first coders are run-length-coders.

35. The coding apparatus as claimed in claim 33 wherein said second coders are variable-length-coders.

36. The coding apparatus as claimed in claim 35, wherein each of said accumulators for separately accumulating the lengths of coded data from said second coders, comprises:

an adder for adding the lengths of the coded data which is input from a corresponding one of said second coders to a predetermined accumulated length which is fed back from an accumulated length storing unit; and a storing unit for storing the output data of said adder to update a corresponding accumulated length, and outputting the corresponding accumulated length to said adder.

37. The coding apparatus as claimed in claim 35, wherein said minimum selector selects said minimum value and simultaneously inputs respective reset signals to said buffers, thereby resetting said buffers to a predetermined initial value.

38. The coding apparatus as claimed in claim 35, wherein said minimum selector selects said minimum value and simultaneously inputs respective reset signals to said accumulators, thereby separately resetting said accumulators to a predetermined initial value.

39. The coding apparatus as claimed in claim 38, wherein said reset signals which are separately input to said accumulators, reset said accumulators.

40. The coding apparatus as claimed in claim 35, wherein a selecting signal input from said means for selecting a predetermined buffer among said buffers, is a signal for selecting a buffer which stores symbols coded by the second coders according to a scanning pattern that corresponds to a selected minimum value in said minimum selector.

41. The coding apparatus as claimed in claim 33, wherein said segment data represent image segments which are block-wise divisions of predetermined size of an image.

42. The coding apparatus as claimed in claim 33, wherein the segments into which the digital data are divided represent image segments of an image in which the size and shape of said image segments are selected in accordance with objects within said image.

43. The coding apparatus as claimed in claim 42, wherein at least one of said image segments circumscribes a respective given object within said image.

44. The coding apparatus as claimed in claim 42, wherein transform coefficients of image areas outside a corresponding one of said objects but inside a corresponding one of said image segments are selected to be a predetermined value.

45. A decoding apparatus for decoding digital data in response to coded data and scanning pattern data, said apparatus comprising:

means for outputting a predetermined scan address corresponding to said scanning pattern data; and a decoder responsive to said scan address for transforming said coded data into quantization coefficients.

46. The decoding apparatus as claimed in claim 45, wherein said decoder is a run-length-decoder.

47. The decoding apparatus as claimed in claim 45, wherein said scan address outputting means stores a plurality of scanning patterns and selects one of said scanning patterns in response to said scanning pattern data.

48. The decoding apparatus as claimed in claim 45 further comprising a dequantizer for dequantizing the quantization coefficients applied from said decoder.

49. A decoding apparatus for decoding digital data in response to coded data and scanning pattern data, said apparatus comprising:

first decoder for decoding said coded data, thereby transforming said coded data into symbols;

means for outputting a predetermined scan address corresponding to said scanning pattern data; and second decoder responsive to said scan address for transforming said symbols into quantization coefficients.

50. The decoding apparatus as claimed in claim 45 or 49, wherein said coded data is a plurality of data segments representing portions of a single image frame.

51. The decoding apparatus as claimed in claim 45 or 49, wherein said coded data is a plurality of data segments representing portions of a plurality of image frames.

52. The decoding apparatus as claimed in claim 45 or 49, wherein said coded data is a plurality of data segments representing image segments which are block-wise divisions of predetermined size of an image.

53. The decoding apparatus as claimed in claim 45 or 49, wherein said coded data is a plurality of data segments representing image segments of an image in which the size and shape of said image segments are selected in accordance with objects within said image.

54. The decoding apparatus as claimed in claim 49, wherein said first decoder is a variable-length-decoder.

55. The decoding apparatus as claimed in claim 49, wherein said second decoder is a run-level-decoder.

56. The decoding apparatus as recited in claim 55, wherein said scan address outputting means stores a plurality of scanning patterns and selects one of said scanning patterns in response to said scanning pattern data.

57. The decoding apparatus as recited in claim 49, further comprising a dequantizer for dequantizing the quantization coefficients applied from said second decoder.

58. A method for decoding digital data in response to coded data and scanning pattern data, said method comprising the steps of:

decoding said coded data into symbols;

outputting a predetermined scan address corresponding to said scanning pattern data; and transforming said symbols into quantization coefficients in response to said scan address.

59. The method for decoding as claimed in claim 58, further comprising the steps of:

storing a plurality of scanning patterns; and selecting one of said scanning patterns in response to said scanning pattern data.

60. The method for decoding as claimed in claim 58 further comprising a step for dequantizing the quantization coefficients at said transforming step.

61. A coding method for coding digital data which is divided into segments, the method comprising the steps of:

obtaining quantization coefficients of digital data;

arranging said quantization coefficients as a plurality of quantized segment data;

simultaneously scanning said plurality of quantized segment data according to a plurality of scanning patterns, and coding the scanned quantized segment data into symbols in accordance with each of the scanning patterns, each symbol having a length;

separately accumulating said symbols according to said plurality of scanning patterns;

selecting a scanning pattern corresponding to a minimum value among accumulated values of lengths of said symbols obtained at said accumulating step; and selecting as one of transmission data and storage data, the symbol corresponding to the scanning pattern selected at said selecting step.

62. The coding method as claimed in claim 61, wherein said step for selecting a scanning pattern corresponding to a minimum value among accumulated values of lengths of said symbols, includes a sub-step for selecting a minimum value among a plurality of accumulated values and simultaneously resetting the accumulated values to a predetermined initial value, which are initial accumulated values of the step for accumulating the lengths of said symbols.

63. The coding method as claimed in claim 61, wherein said step for selecting a scanning pattern corresponding to a minimum value among accumulated values of lengths of said symbols, includes a sub-step for selecting a minimum value among a plurality of accumulated values and simultaneously resetting the data to a predetermined initial value, which is coded data at said coding step.

64. The coding method as claimed in claim 61, wherein said coding step is a run-length-coding step.

65. The coding method as claimed in claim 61 further comprising a step of coding said symbols.

66. The coding method as claimed in claim 65, wherein said coding step for coding said symbols is a variable-length-coding step.

67. The coding method as claimed in claim 61, wherein said segment data represent image segments which are block-wise divisions of predetermined size of an image.

68. The coding method as claimed in claim 61, wherein said segment data represent image segments of an image in which the size and shape of said image segments are selected in accordance with objects within said image.

69. The coding method as claimed in claim 61, wherein said plurality of said quantized segment data represent image portions of a single image frame.

70. The coding method as claimed in claim 61, wherein said plurality of quantized segment data represent image portions of a plurality of image frames.

71. The coding method as claimed in claim 70, wherein said plurality of image frames are separated in time.

* * * * *